(12) United States Patent
Druschel et al.

(10) Patent No.: US 9,165,155 B2
(45) Date of Patent: Oct. 20, 2015

(54) PROTECTING THE INTEGRITY AND PRIVACY OF DATA WITH STORAGE LEASES

(75) Inventors: Peter Druschel, Saarbruecken (DE); Rodrigo Rodrigues, Saarbruecken (DE); Ansley Post, Zurich (CH); Johannes Gehrke, Ithaca, NY (US); Anjo Lucas Vahldiek, Saarbruecken (DE)

(73) Assignee: MAX PLANCK GESELLSCHAFT ZUR FOERDERUNG DER WISSENSCHAFTEN, Munich (DE)

( * ) Notice: Subject to any disclaimer, the term of this patent is extended or adjusted under 35 U.S.C. 154(b) by 99 days.

(21) Appl. No.: 13/282,847

(22) Filed: Oct. 27, 2011

(65) Prior Publication Data

US 2012/0110338 A1 May 3, 2012

Related U.S. Application Data

(60) Provisional application No. 61/407,417, filed on Oct. 27, 2010.

(51) Int. Cl.
*G06F 21/00* (2013.01)
*G06F 21/62* (2013.01)

(52) U.S. Cl.
CPC .... *G06F 21/6218* (2013.01); *G06F 2221/2137* (2013.01)

(58) Field of Classification Search
CPC ............ G06F 21/6218; G06F 2221/2137; G06F 9/5011; G06F 9/5016; G06F 9/50; G06F 3/0644; G06F 12/0253; G06Q 30/0645
USPC ........... 709/203, 223, 226; 718/104; 713/178, 713/182; 707/10, E17.01, 999.205; 726/1, 726/17, 2; 711/170
See application file for complete search history.

(56) References Cited

U.S. PATENT DOCUMENTS 6,519,615 B1 2/2003 Wollrath et al.
(Continued)

OTHER PUBLICATIONS

Haeberlen (Glacier: Highly durable, decentralized storage despite massive correlated failures, In Proc. of the 2nd Symposium on Networked Systems Design and Implementation, May 2005).*
"International Search Report dated Dec. 7, 2011", International Application PCT/EP2011/068868, 4 pages.
(Continued)

*Primary Examiner* — Brian Shaw
(74) *Attorney, Agent, or Firm* — Novak Druce Connolly Bove + Quigg LLP (57) ABSTRACT

Storage leases specify access restrictions and time periods, restricting access to their associated data during the storage lease time period. Storage leases may be assigned to individual data storage blocks or groups of data storage blocks in a data storage device. A data storage device may include any arbitrary number of different storage leases assigned to different portions of its data storage blocks. Storage lease-enabled devices may provide security certificates to verify that data access operations have been performed as requested and that their storage leases are being enforced. Storage lease-enabled devices compare storage lease information for data units with the current time using a clock isolated from access by storage clients or time certificates from one or more trusted time servers. Storage leases may be used in combination with backup applications, file systems, database systems, peer-to-peer data storage, and cloud storage systems.

17 Claims, 3 Drawing Sheets

(56) References Cited

U.S. PATENT DOCUMENTS

| | | | |
|---|---|---|---|
| 6,603,857 B1* | 8/2003 | Batten-Carew et al. | 380/44 |
| 7,260,543 B1 | 8/2007 | Saulpaugh et al. | |
| 2002/0056042 A1* | 5/2002 | van der Kaay et al. | 713/178 |
| 2002/0152214 A1* | 10/2002 | Muntz | 707/10 |
| 2003/0145210 A1* | 7/2003 | Taylor | 713/182 |
| 2007/0277016 A1* | 11/2007 | Risse | 711/170 |
| 2008/0059969 A1* | 3/2008 | Johnson | 718/104 |

OTHER PUBLICATIONS

Mills, David L., "Public Key Cryptography for the Network Time Protocol Version 2", draft-ietf-stime-ntpauth-04.txt, 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11AND ITU-T SG.16); URL:http://wftp3.itu.int/av-arch/jc tvc-site/-17/02/2011, Internet EN, 2002, 66 pages.

* cited by examiner

PROTECTING THE INTEGRITY AND PRIVACY OF DATA WITH STORAGE LEASES

CROSS-REFERENCE TO RELATED APPLICATIONS

This application claims priority to U.S. Provisional Patent Application No. 61/407,417, filed Oct. 27, 2010, and entitled "Protecting Data Integrity With Storage Leases," which is incorporated by reference herein for all purposes.

BACKGROUND OF THE INVENTION

The invention relates to the field of computer security and data storage system, and specifically to systems and methods for protecting the integrity and confidentiality of stored data due to inadvertent or malicious operations.

Society's ever-increasing dependence on digital information underlines the importance of protecting data stored in a digital format. Corporations, government, and other professional organizations need to protect their digital assets, since data loss or leakage can directly translate into operational disruption, financial losses, or the loss of irreplaceable cultural and historical artifacts. Even individuals increasingly store valuable digital information, such as personal financial and professional documents, as well as photos, videos, personal letters and other information of substantial sentimental value.

There are many threats to the durability and integrity and confidentiality of digitally stored data, ranging from failure or destruction of storage media and devices, bugs in various parts of the software stack (e.g. device drivers, storage system software, operating systems, or applications), operator error (either intentional or accidental), or deliberate manipulation by malicious intruders or malware running on a machine with access to the data.

Many of these threats can be mitigated by storing data redundantly. For instance, error-correcting codes can mask bit errors, striping or mirroring can mask block or device failures, and backup data copies can enable recovery from catastrophic storage system failures. However, threats from malicious intruders, viruses and worms, software bugs and operator errors may affect all copies of stored data that are on-line and writable. Redundancy alone is not sufficient to mitigate these threats.

To protect the data from such threats, backup copies currently must be maintained in either off-line or write-once storage. Enterprise storage solutions include such archival storage. Typically, data is backed up on tapes that are unmounted after a backup session. Tape cartridges, magneto-optical and ultra-density optical disks offer a write-once option, offering additional protection for existing data while the medium is mounted. Finally, high-end network-attached storage systems can be programmed to accept only the first write to a given storage block (WORM storage), even though the underlying storage is based on conventional disk drives.

However, individual home users and small businesses often do not have the time, expertise, or budget to take advantage of such advanced solutions. High-end solutions like tape robots and network-attached WORM storage systems are fully automated but too expensive; whereas low-end write-once optical disks and magnetic tape drives are inexpensive, but require diligence and regular attention by an administrator. Moreover, existing write-once storage solutions are expensive to administer for enterprises and waste storage capacity by retaining data for longer periods than needed.

BRIEF SUMMARY OF THE INVENTION

Embodiments of the invention include storage leases that specify access restrictions, such as a read restriction or a write restriction, and time periods for one or more units of data, such as one or more data storage blocks in a data storage device. Storage leases restrict access to their associated data during the storage lease time period. Storage leases may be assigned to specific units of data, such as individual data storage blocks or groups of data storage blocks in a data storage device. A data storage device may include any arbitrary number of different storage leases assigned to different portions of its data storage blocks.

Storage lease-enabled devices may provide security certificates or other forms of cryptographic authentication to verify that data access operations have been performed as requested and that their storage leases are being enforced. To enforce storage leases, embodiments of storage lease-enabled devices compare storage lease information for data units with the current time. Storage lease-enabled devices may include a clock isolated from access by storage clients or may receive time certificates from one or more trusted time servers.

Storage leases may be used in combination with backup applications. Embodiments of the invention may be used with these types of incremental backup applications by storing the snapshots under a storage lease for the snapshot's retention period (e.g., daily snapshots kept for a week, weekly snapshots kept for a months, etc.). In these embodiments, the storage leases provide an extra level of protection for snapshots from software errors, operator mistakes, malware and other system intrusions. Other applications of storage leases include peer-to-peer data storage and cloud storage systems.

BRIEF DESCRIPTION OF THE DRAWINGS

The invention will be described with reference to the drawings, in which.

DETAILED DESCRIPTION

Embodiments of the invention include a storage abstraction referred to as a storage lease. A storage lease specifies an access restriction, such as a read restriction or a write restriction, and a time period for one or more units of data, such as one or more data storage blocks in a data storage device. Storage leases restrict access to their associated data during the storage lease time period. For example, data stored in association with a storage lease write restriction cannot be overwritten for the storage lease time period. During the storage lease time period, this associated data is protected from corruption due to security breaches, software errors, or accidental data deletion. Unlike write-once storage, the data units, such as data storage blocks, associated under a storage lease can be reclaimed after the lease period expires.

Storage leases may be assigned to specific units of data, such as individual data storage blocks or groups of data storage blocks in a data storage device. A data storage device may include any arbitrary number of different storage leases assigned to different portions of its data storage blocks. Storage leases provide a powerful abstraction, and can be implemented with a small trusted computing base. For example, storage leases may be implemented within the firmware of a mechanical or solid-state disk, so that the access restrictions and time periods are enforced despite errors or compromises in the operating system, file or storage software.

In general, storage leases may restrict read and/or write access to data. Additionally, storage leases restrict read and/or write access for one of two types of time periods. First, a "present" storage lease may restrict data access from the time the storage lease is created (e.g. the present) up to a specific future time. Second, a "future" storage lease may allow data access from the time the storage lease is created until a specific future time. The future storage lease then restricts data access from this future time period forward (either indefinitely or until a specified further future time). Table 1 illustrates several examples of different applications enabled by present and future storage leases in combination with read and write restrictions.

TABLE 1

Storage Lease Applications

| | Write Restriction | Read Restriction |
| --- | --- | --- |
| Present Storage Lease (Access restriction starts at time of lease creation) | Data protection | Time capsule |
| Future Storage Lease (Access restriction starts after lease creation) | Data snapshot | Data expires |

A present storage lease associated with a write restriction may be used in data protection applications. Data stored under this type of storage lease may not be modified or deleted until the storage lease time period expires (if ever).

A present storage lease associated with a read restriction may be used in a "time capsule" application. Data stored under this type of storage lease may not be read until the storage lease time period ends. This prevents data from being read until a specified time in the future, much like a time capsule preserves objects for discovery in the future.

A future storage lease associated with a write restriction may be used in data snapshot applications. Data may be modified or deleted from the time of storage lease creation up until the beginning of the storage lease time period, as specified by the storage lease. At this point, further changes to the data are prohibited. Thus, this storage lease allows applications to preserve a "snapshot" of the data at a specific moment of time.

A future storage lease associated with a read restriction may be used in data expiration applications. Data associated with this storage lease may be read from the time of the storage lease creation up until the beginning of the storage lease time period, as specified by the storage lease. At this point, further reads of this data are prohibited. This storage lease allows data to expire and automatically disappear after a specified time period. In a further embodiment, if the storage lease time period of a future storage lease with a read restriction has begun, the data storage device may mark the associated storage blocks or other data units as unused, so that they may be reclaimed and overwritten with new data.

In additional embodiments, future storage leases with read and/or write restrictions may include a lease expiration time in addition to a lease start time. This enables a future storage lease to start restricting read and/or write access at a future time and then end its restriction at a still later time.

Figure 1:
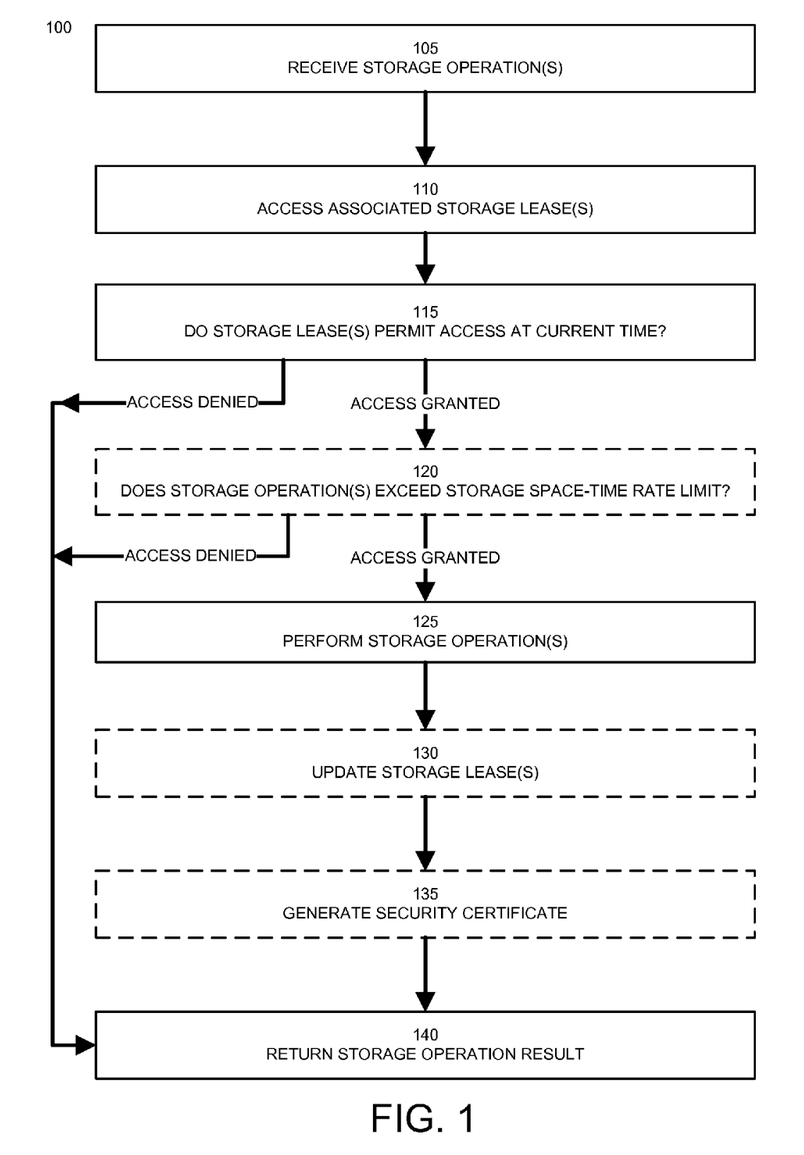
FIG. 1 illustrates a method of performing storage operations in conjunction with storage leases according to an embodiment of the invention.

FIG. 1 illustrates a method 100 of performing storage operations in conjunction with storage leases according to an embodiment of the invention. Step 105 receives one or more storage operations. Storage operations may include data write operations and data read operations. In some embodiments, the storage lease interface is similar to that of a block storage device, such as a disk drive or other non-volatile data storage device. In these embodiments, a storage operation includes attributes specifying the type of data access (e.g. read or write) and an address or other identifier of one or more storage blocks or other units of data to be accessed. Defining the storage lease interface at the block level allows an implementation of storage leases in the firmware of a storage device (e.g., a disk drive). Such an implementation depends only on the integrity of the disk firmware and hardware, and is robust to bugs and compromises of all higher-level software.

An embodiment of the storage lease interface is described in table 2.

TABLE 2

Example Storage Lease Interface

| Function | Description |
| --- | --- |
| BId startBatch( ) | starts a new batch and returns its id; fails if too many open batches |
| void write(BId id, Bnum b, Expiration <time1, time2>, rw<read, write>, void *buf) | writes data block #b from buffer buf with storage lease period from time1 to time2; storage lease restricts read and/or write access as specified by bitmask rw |
| void read(BId id, Bnum b, void *buf) | reads block #b and stores it in buffer buf |
| void update(BId id, Bnum b, Expiration <time1, time2>, rw<read, write>) | extends the lease of block #b with storage lease period from time1 to time2; storage lease restricts read and/or write access as specified by bitmask rw; fails if the period <time1, time2> does not include the current lease period fully, or space-time rate limit exceeded |
| Expiration attest(BId id, Bnum b) | returns the current lease period and time for block #b, or zero if block is not covered by an active lease |
| void flush( ) | Ensures that previously written data blocks and any associated leases are committed to non-volatile storage |

TABLE 2-continued

Example Storage Lease Interface

| Function | Description |
| --- | --- |
| Hash hash(BId id) | returns the accumulated data hash in the batch, then reinitializes the hash accumulator; read, write and attest operations update the hash accumulator with the hash of the block they act on |
| Certificate getCertificate(BId id) | performs a flush operation and then returns a certificate confirming the set of operations in the batch; the certificate is a signed hash of the set of successful operations in the batch, including their arguments and results |
| void endBatch(BId id) | terminates a batch; subsequent invocations of any operation with this batch id fail |
| Nonce getNonce( ) | Returns a nonce value for the purpose of obtaining a time certificate |
| void setTime(TimeCerticate T) | Advances the device's clock to the time provided in the certificate T; fails if T's signature can't be verified or does not include the correct nonce; ignored if T's time is less than or equal to the device's current time |
| void setRate(long rate) | Sets the rate at which the device admits new leases by specifying the maximal rate of storage space-time committed per day; only the first invocation succeeds |

The example storage lease interface, as shown in Table 2, includes three elements that depart from a traditional block device interface:

Lease period: Storage operations may include one or more arguments defining a lease time period, such as an implicit lease period start time and an explicit lease period expiration time, two time periods defining the starting and ending times of the lease period, and/or a lease start time and lease time duration t for the lease of the newly written block as an argument. A storage operation such as a read or write fails if the target block is currently protected by a lease, or granting the lease would exceed the rate limit R. There is also an update operation used to extend the lease period of an existing block, and an attest operation used to obtain the lease period and type of an existing block.

Certificates: The storage lease interface allows clients to obtain a signed lease certificate after data has been written with a given lease type and period. Note that the certificate must cover the starting and ending times of a lease (and not the lease duration) to prevent replay attacks.

Batching: To amortize the overhead of signature generation for certificates, a sequence of storage lease operations can be batched together and a single certificate issued for the batch. Reducing the number of signatures to one per batch instead of one per operation greatly improves the performance of, for instance, large file writes consisting of many block writes.

In a further embodiment, higher-level software and/or hardware, such as device drivers, operating systems, and user applications, may have some control over how storage operations are grouped or delimited into batches, so that the certificate can identify objects such as files or directories rather than blocks. Therefore, an embodiment of the storage interface includes a hash command. The example hash command allows applications, at any time within a batch, to obtain a hash of a series of data blocks operated on as part of the batch. These hash values are what is attested to when a certificate is subsequently generated.

In an embodiment, certificates have the following format: $[Hash(O_1+O_2+ \ldots +O_n),D]\sigma D$ where $O_1, \ldots, O_n$ is a sequence of operations in a batch, as delimited by the application, + indicates concatenation, and D the storage lease device. Moreover, $O_i$ is the concatenation of the operation identifier, arguments and results of the ith operation in the batch.

Step 110 accesses the storage leases for the data blocks or other units of data storage that are specified by the received storage operation(s) to determine if the requested storage operations may be completed. For example, data blocks that have been previously written may already be associated with a storage lease.

In an embodiment, the data storage device sets aside a portion of data blocks on the storage device to store storage lease information, such as the lease expiration times for each of the primary data blocks. The portion of the data blocks storing storage lease information is referred to as lease blocks. For example, a 12-bit timestamp is sufficient for a storage lease time granularity of one day, assuming a device lifetime of 10 years. Using these timestamps, the overhead for storing lease information, (two timestamps plus two bits for the read/write bitmask), for each 4 KB data block), is less than 0.08% of the storage capacity of a data storage device. In other embodiments, the storage lease information may be stored in a separate storage device from the data blocks, such as in non-volatile memory devices such as flash memory.

Because the data storage device must access each storage block's associated storage lease before writing or performing any other storage operation on that storage block, an embodiment of the invention includes fast memory, such as DRAM or SRAM, for maintaining a cache of lease blocks in the block storage device. In this embodiment, modified lease blocks are flushed from the cache to corresponding lease blocks in the nonvolatile data storage medium, such as a disk or solid state storage device, before a certificate for the respective batch of writes is returned or a flush operation is completed (only then can the application be sure that the storage lease was successfully created).

For disk-based block storage devices, an embodiment of the invention groups lease blocks on the physical disk into subsets of at least the same size as the cache line of the storage lease cache. Therefore, once the disk head is positioned for a desired lease block, an entire subset of lease blocks can be read or written efficiently to/from the cache, taking advantage of likely spatial locality. In a further embodiment, the lease block subsets are placed equidistantly on the disk, such that a subset contains storage lease information for the data blocks physically near to this subset. This choice minimizes, subject to the choice of lease block subset size, the seek distance between a data block and the lease block containing the associated lease. This arrangement of lease blocks may be omitted if the storage device is based on solid state storage devices or other devices where seek times are not applicable.

Step 115 determines the current storage leases for the data blocks specified by the received storage operations. In an embodiment, step 115 compares the value representing the current date and operation type (read/write) with the timestamp values and r/w bitmask of the storage lease for each storage block specified by the received storage operation. If the current time is within the permitted time period specified by the storage lease for the attempted operation type, then method 100 proceeds from step 115 to optional step 120 or step 125 for this storage block. Otherwise, access to this storage block for the storage operation is denied and method 100 proceeds from step 115 to step 140.

For example, a storage lease may specify that write operations to a storage block are prohibited until after a specific date and time. If the storage operation is a write operation, step 115 compares the current time with this timestamp value. If the current time is after this timestamp value, then method 100 proceeds from step 115 to optional step 120 or step 125 for this storage block to potentially allow this write operation to proceed. In another example, if the storage lease specifies that read operations are prohibited before or after a specified date and the storage operation is a read operation, then step 115 compares the current time with this timestamp value to decide whether to permit the read operation to proceed.

If lease blocks become corrupt, the storage device can no longer validate whether a storage operation for a corresponding data block should be allowed. Embodiments of the invention may handle this situation in a number of ways, such as: (i) replicating lease blocks and storage lease information, which would increase the overhead of storing lease information; (ii) optimistically allow the storage operation to proceed, potentially risking data loss or leakage if the storage operation is a write or read operation, respectively; and/or (iii) upon detection of lease information corruption, setting all corresponding storage leases to the lifetime of the storage device and disallowing writes while allowing reads. As a further precaution, an embodiment of the invention isolates lease blocks and storage lease information from direct access by storage clients to prevent malicious or inadvertent corruption of lease blocks.

Because step 115 compares storage lease timestamps with the current time, embodiments of the invention include the use of at least one independent source of the current time that cannot be disabled or modified by an attacker. In an embodiment, a storage device supporting storage leases includes an internal hardware real-time clock and battery to provide a secure time reference.

Another embodiment of the invention relies on secure time certificates to provide a secure time reference. This embodiment relies on an assumption that the passage of time may be tracked at a coarse granularity, because storage leases are typically for long periods, e.g. months. Thus, a coarse precision on the order of one day is acceptable for some applications.

Given this observation, it is sufficient for some embodiments of the invention to have the operating system periodically provide a signed time certificate generated by a trusted time server to the device. In an embodiment, a trusted network time server provides cryptographically signed and/or authenticated time certificates to storage clients via local and/or wide-area network connections, potentially including the Internet. Storage clients then provide the time certificate to the storage device through the storage device interface or other API. A trusted network time server may cache time certificates and serve copies to large numbers of storage clients. To prevent the trusted network time server from being comprised, security procedures such as offline signing keys and manually verified clock may be used. For example, once a day, a new certificate can be generated at an off-line computer and manually transferred to the on-line trusted time server, using a portable storage device like a USB stick. Such time servers could be operated, for instance, by the vendors of storage lease-enabled storage devices or other trusted third-parties.

In yet a further embodiment, this scheme can be further strengthened by requiring that the storage device receive multiple time certificates from different independent trusted sources.

In an embodiment, a storage device may require an up-to-date time certificate once a day or at some other regular interval. Here, the device ensures freshness of the time certificate by providing a random nonce, and insisting that the nonce be included in the time certificate as signed by the time server. In an additional embodiment, the storage device may determine whether a new time certificate is needed (e.g. the passage of 24 hours or another time interval) by measuring periodic mechanical, electronic, or other types of processes of the storage device, such as counting spindle revolutions of a hard disk drive to determine the approximate passage of time. In a further embodiment, a storage device may require an up-to-date time certificate from a time server each time it is turned on.

Even if the time source is secure from attacks, malicious applications could still hinder the performance of the storage device by issuing large numbers of storage writes with storage lease time stamps set to times far into the future. This would have the effect of wasting all of the unused storage in the storage device. To mitigate this risk, an embodiment of the invention uses storage space-time limits to limit the rate at which storage resources can be consumed.

Optional step 120 determines if the received storage operation(s) exceed the storage client's storage space-time limit. In an embodiment, a storage space-time limit characterizes the resources used by storage leases in a storage device in terms of both the amount of storage space used by the storage client and the time period that the storage lease limits access to the data. For example, a storage space-time value may be expressed as $s_i = n_i * t_i$, where $n_i$ is the amount of data covered and $t_i$ is the time period of lease i, for leases that disallow writes (leases that disallow reads only consume no space time). The total space-time S committed in a device is $S = \Sigma_{i \in L} s_i$, where L is the set of existing leases (whether expired or not) in the device that disallow writes.

To mitigate space-time filling attacks, an embodiment of a storage lease enabled device limits the rate at which storage space-time can be consumed by new leases, i.e., $$\frac{dS}{dt} \leq R,$$

where R is the storage space-time rate limit.

In an embodiment, the storage space-time rate limit R of a storage device may only be set once by the administrator installing the device; this limit R should be chosen to limit the storage space-time that an attacker can consume within a given period. For example, assuming that a virus infection or a security breach is detected within a time period no greater than $T_{detect}$, and that a device with capacity C has an expected lifetime of L, i.e., after L units of time the device will be filled with storage leases when used at its maximum rate. Then, an embodiment of the invention can ensure that an attacker can, for example, at most consume 1% of the device's total space-time by setting $$R = 0.01 \frac{C * L}{T_{detect}}.$$

Similarly, the storage space-time rate limit may be set to other values to limit potential attackers to any arbitrary fraction of the storage device's total capacity.

Choosing a storage space-time rate limit R involves a trade-off between limiting the damage an attacker can cause and admitting legitimate storage leases at a sufficient rate to cover peak demand. In practice, however, satisfying the latter concern is not as critical as it may seem. First, there is often high demand for space-time during the installation of a new storage device, e.g., when an operating system or a database is installed. In a further embodiment, the storage space time rate limit may be disabled during the period of device initialization and then set and enabled after the initialization. Second, legitimate users of leases (e.g., file systems or backup applications) can work around the storage space-time rate limit should they exceed it during peak demand; they can simply request a lease with a shorter period than desired, and extend the lease prior to its expiration. An attacker, on the other hand, only has limited time until detection, and can at most consume storage equal to $R*T_{detect}$ of storage space-time.

Nevertheless, if an attack is not detected for a long time, a large amount of storage space-time may be wasted. To enable recovery from such an event, a further embodiment of a storage lease-enabled device may provide a hardware switch (such as DIP switch or jumper) on the circuit board of the device, which can be used to reset all leases and the rate R. The switch can be operated by an expert as part of the system recovery. In this embodiment, the security guarantees of storage leases are not affected by the presence of such a hardware switch, because it cannot be activated by any software action. In another example, the storage leases of a storage device may be reset using a software command received from a trusted system, using cryptography to verify the identity of the trusted system.

Optional step 120 determines if the storage client associated with the received storage operation(s) has exceeded the storage space-time rate limit. In an embodiment, step 120 checks the sum of space-time storage lease commitments due to new or extended leases during the past 24 hours and rejects the request if the rate exceeds the storage space-time rate limit R. If a storage operation is rejected, method 100 proceeds to step 140. Of course, the system can retry a rejected storage operation with a shorter storage lease period and thus a smaller storage space-time commitment. In some cases, a storage operation may be denied because the storage device's notion of real-time is behind the actual time or the device has not received a fresh time certificate for too long (e.g. for more than 24 hours or since it was last powered up), if the storage device relies on a secure external time reference. In this case, the storage client may provide the storage device with a recent time certificate to resolve this problem and retry the operation.

If the received storage operation satisfies steps 115 and optional step 120, then step 125 permits the received storage operation to proceed. Following completion of the storage operation, such as a data read or write, method 100 proceeds to optional step 130.

Some storage operations, such as data writes, may add a storage lease or modify an existing storage lease. Optional step 130 adds or updates the storage lease information for the associated data as necessary. Storage lease data may be added or updated to lease blocks on the data storage medium and/or in a cache of storage lease information. If the storage operation does not require an addition or update of storage lease information, step 130 may be omitted.

Optional step 135 generates a security certificate in response to the successful completion of one or more received storage operations. The security certificate provides cryptographically secure confirmation that the data was read or written with the requested storage lease period to the storage lease-enabled device.

Security certificates are useful when storage lease-enabled devices are attached to storage clients that may be compromised. For example, a user may have two storage clients, such as two computers, in a home or corporate network, m1 and m2. Storage client m2 is infected by a virus but storage client m1 is not. When storage client m1 tries to use storage client m2's storage lease-enabled device to back up data, the malicious software running on storage client m2 might act is if it had stored the data but in practice it discards it, leading storage client m1 to wrongfully believe the data had been backed up. To prevent this attack, an application, such as a backup application, on storage client m1 can request a security certificate from the storage lease-enabled device. This security certificate provides a cryptographically signed confirmation of the write operation.

In an embodiment, a security certificate is generated by a storage lease-enabled device using any cryptographic techniques known in the art for verifying the identity of an entity, including symmetric and/or asymmetric key cryptography, digital signatures, cryptographic hashes and checksums, and trusted certificate authorities. In a further embodiment, the security certificates should cover the start and ending time of the lease (and not the lease duration) to prevent replay attacks.

Security certificates should use cryptographic primitives strong enough to prevent attacks on the signing keys. One implementation relies on the planned obsolescence of storage devices. Because the lifetime of a storage device is typically on the order of 10 years, the cryptographic signing keys and cryptographic techniques need only be secure for that period of time. In this implementation, there is no need for updates of the cryptographic libraries or keys on a device. The necessary keys can be assigned, and their validity verified once the devices are deployed, by the device manufacturer; cryptographic algorithms can be upgraded with each new device generation.

In an alternate embodiment, cryptographic primitives and techniques may be updated via a firmware update from a trusted source.

In some implementations, generating a separate security certificate for each storage operation may incur a substantial performance cost. To alleviate this, implementations of storage devices may generate a security certificate for a group or batch of storage operations, thereby reducing the frequency of certificate generation to a point where performance is not of concern. For instance, a typical embedded ARM processor, which is used in a number of existing storage devices, would be sufficient to rapidly generate signatures for batches of storage operations. Additionally, the state associated with a batch of storage operations does not require more than a few hundred bytes, and can be stored in the storage device controller's existing RAM.

In another embodiment, a cryptographic coprocessor or trusted platform module may be used to enable more advanced, more frequent, or finer grained generation of digital signatures.

In further embodiments, storage lease-enabled storage devices may use security certificates for other purposes, such as to provide proof of storage commitment in environments where multiple parties from mutually distrusting administrative domains need to interact, such as peer-to-peer storage systems or cloud storage.

Following the completion of the received storage operation and the optional update of storage lease information and/or generation of security certificates, step 140 returns the result of the storage operation to the storage client. If the storage operation was a data write, step 140 may return a confirmation of the write operation and optionally a security certificate. If the storage operation was a data read, step 140 may return the data requested by the storage client. If the storage operation was denied by steps 115 or 120, then step 140 may return an error message indicating to the storage client that the requested storage operation could not be completed.

Figure 2:
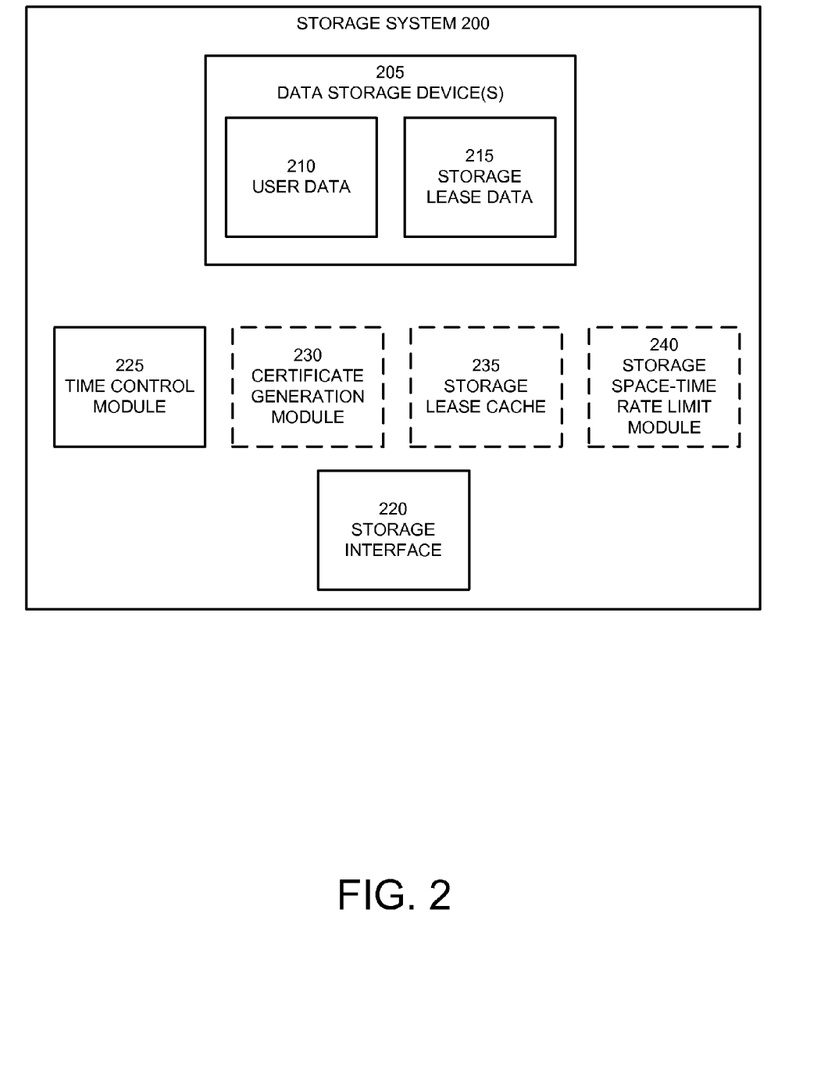
FIG. 2 illustrates components of a storage system supporting storage leases according to an embodiment of the invention.

FIG. 2 illustrates components of a storage system 200 supporting storage leases according to an embodiment of the invention. Storage system 200 includes one or more non-volatile data storage devices 205, such as hard disk drives and/or solid state or flash memory storage devices. If storage system 200 includes multiple data storage devices 205, these may be arranged as a single or multiple logical storage devices for the purposes of data access by storage clients. Additionally, multiple data storage devices 205 may configured for data access optimization and/or data redundancy, such as a RAID configuration.

The one or more data storage devices 205 in storage system 200 may include user data 210 and storage lease data 215. User data 210 may be arranged in the form of storage blocks including user data, error correction information, addressing or access information, and/or file system information. Storage lease data 215 may be arranged in the form of lease blocks storing storage lease information such as time stamps and operation types for individual or groups of storage blocks. User data 210 and storage lease data 215 may be stored in the same data storage device or in separate data storage devices. In an embodiment, storage blocks and lease blocks are interleaved in the same data storage device to optimize access times, as described above.

In addition to one or more data storage devices 205, storage system 200 includes a storage interface 220, a time control module 225, an optional certificate generation module 230, an optional storage lease cache 235, and an optional storage space-time rate limit module 240.

Storage interface 220 is adapted to receive storage operations from one or more storage clients. Storage interface 220 may use a low-level hardware bus interface, such as serial or parallel ATA interfaces and PCI Express interfaces; peripheral device interfaces, such as the various versions of the USB interface, Firewire or IEEE 1394 interfaces, SCSI, and the Thunderbolt interface; storage network hardware interfaces and protocols, such as iSCSI and Fibre Channel; network hardware interfaces and network file system protocols, such as NFS and CIFS; and/or any other type of data storage interface known in the art.

Time control module 225 maintains the current time or an approximation thereof and is used to determine whether storage leases permit storage operations to be performed. Embodiments of the time control module 225 may include a hardware real-time clock and battery backup and/or memory for storing the current time received from a trusted independent network time source, such as through cryptographically signed time certificates. In the latter implementation, time control module 225 may also include hardware and/or software for receiving and validating time certificates.

Optional certificate generation module 230 is adapted to generate security certificates in response to the successful completion of one or more received storage operations. The security certificate provides cryptographically secure confirmation that the data was read or written with the requested storage lease period to the storage lease-enabled device. Security certificates may also be generated for other purposes, including providing proof of storage commitment in environments where multiple parties from mutually distrusting administrative domains need to interact, such as peer-to-peer storage systems or cloud storage. Certificate generation module 230 may be implemented using a dedicated cryptographic processor or in the form of software executed by a general-purpose microprocessor or microcontroller. For example, a cryptographic processor such as the SafeNet SafeXcel-1741 can hash data and generate RSA signatures.

Optional storage lease cache 235 includes memory, such as static or dynamic RAM, for storing a copy of all or a portion of the lease data, such as one or more lease blocks. In general, storage lease cache 235 may be accessed faster than the data storage device 205. Any changes or additions to storage lease data may be written to the storage lease cache 235 and copied back to storage lease data 215.

Optional storage space-time rate limit module 240 tracks storage space-time usage for one or more storage clients and calculates their rate of storage space-time usage over a time period, such as 24 hours. Storage space-time rate limit module 240 also stores storage space-time rate limits for one or more storage clients for the purpose of comparison with storage clients' current storage space-time rate usage.

Storage interface 220, storage lease cache 235, and time control 225, certificate generation 230, and storage-space-time rate limit modules 240 may be implemented using any combination of dedicated hardware and/or a general-purpose microprocessor or microcontroller and software.

Storage system 200 may be implemented in a variety of different form factors and configurations to meet users' needs, including standalone mass storage devices, such as hard drives and solid-state drives; storage enclosures adapted to interface with one or more standard mass storage devices; and standalone storage interface or controller devices adapted to interface with one or more external mass storage devices. In a further embodiment, storage system software, such as device firmware, can be updated. To prevent an attacker from bypassing the lease protection, firmware updates must be protected. In an embodiment, storage system 200 accepts only updates that are signed by the device vendor or another trusted authority. The cryptographic infrastructure already in place for verifying time certificates can be reused for this purpose.

In another embodiment, storage system 200 can be implemented within a general purpose computer in the form of a software within an operating system or device driver. In this embodiment, the operating system kernel or other software and hardware modules used by this software-only implementation need to be protected from malicious software. This may be done using a trusted computing platform or other security features included in the computer system. Additionally, the risk of compromise due to bugs or malicious software may be mitigated by reducing the size of the trusted computing base, either through the use of a micro-kernel or a virtual machine monitor.

In still a further embodiment, storage leases can be implemented as part of a cloud storage service. In this case, the cloud service implements and ensures the guarantees associated with storage leases. Here, the trusted computing base for storage leases comprises the cloud service implementation. While this computing base is substantial, it is professionally managed and can be designed to have a narrow interface that minimizes the attack surface. Moreover, the faults it may suffer are unlikely to be correlated with a fault or compromise in the customer's computing base. Thus, a combination of client side storage lease-enabled storage devices and a storage lease-enabled cloud service provides strong protection from operator error, software faults, security compromises, and even catastrophic site failures.

Storage leases have a variety of uses. In one embodiment, a storage lease enabled device appears to the operating system as a normal block storage device or other type of data storage device with an augmented interface for setting storage leases. As such, the storage lease-enabled device is fully backward compatible and an unmodified operating system can use it as if it was a normal device. To make use of storage leases, however, an operating system, file system or application may be modified to use the extended interface to set and access storage leases, and it has to be prepared to deal with the semantics of blocks or other data units protected by a storage lease.

A data backup and restore application is one usage of storage leases. Implementing a backup and restore application that uses storage leases is relatively straightforward. A dedicated storage lease-enabled device (or a dedicated partition on such a device) may be used for storing backup snapshots. The backup application mounts the partition or device as a raw device. It uses the usual block operations to read and write blocks, as well as the extended lease interface, for example via IOCTL calls.

The backup application can chose any data and metadata format it desires to store backup snapshots provided that the application respects the semantics of leases. For example, all data and metadata associated with a snapshot must be stored under a lease with a period that at least equals the intended retention time of the snapshot. In a further example, any metadata that is shared among snapshots may be append-only, because a storage block including shared metadata is stored under a lease cannot be modified until the lease expires.

In this example backup application, no modifications are required to operating systems or file system, other than those to the disk device driver or API to support the storage lease-related calls.

A lease-aware file or database system is another usage of storage leases. For instance, a lease-aware snapshotting file or database system could use leases to protect the integrity of in place, copy-on-write snapshots, obviating the need to copy data to a dedicated device as part of a backup. Here, a lease disallowing writes to the appropriate data blocks takes effect at the time of the intended snapshot and ends at a later date when the snapshot is no longer relevant.

A lease-aware file system may be based on any snapshotting file system, such as WAFL or ZFS, with further modifications to support storage leases. For example, the file system may be extended to request leases for all data and metadata blocks associated with a given snapshot. Additionally, the file system allocator may be modified to be aware that leased blocks cannot be reclaimed until the lease expires. Lastly, the file system may be modified so that metadata stored under a lease is append-only.

A lease-aware application, file system or database system may use storage lease to disallow the reading of specific data blocks or groups of data blocks after a pre-determined date, for instance, to satisfy legal or regulatory requirements for data deletion. Similarly, a lease-aware application, file system or database system may use storage leases to disallow the reading of data blocks or groups of data blocks before a pre-determined date, for instance, to satisfy legal requirements for declassification of data (such as, for instance, government records).

Peer-to-peer storage is another usage of storage leases. In this usage, lease certificates can be used as proof of resource usage in volunteer-based systems where users might not have the right incentives to contribute to the system. For instance, in a cooperative peer-to-peer backup system, peers might pretend to contribute their fair share of resources, while in reality they are using the system without storing data on behalf of others. With storage leases, peers can demand lease certificates to other peers that are supposed to store their data, and exclude those that refuse to present lease certificates. This prevents peers from free-riding on the resources provided by other peers. Embodiments of the invention may incorporate the generation and/or verification of lease certificates within a peer-to-peer software application, an operating system, and/or within memory and/or firmware of a storage device.

Cloud storage is another usage of storage leases. In this usage, lease certificates can also be used by cloud providers to prove to their customers that their data is being stored for a certain period, and also that certain replication levels are being met. This would add value to a cloud storage service, since it would increase transparency, and overcome one of the main concerns that deter potential customers of cloud services, namely that a lack of proper data management from the cloud provider might lead to data loss, as has happened in the past.

Figure 3:
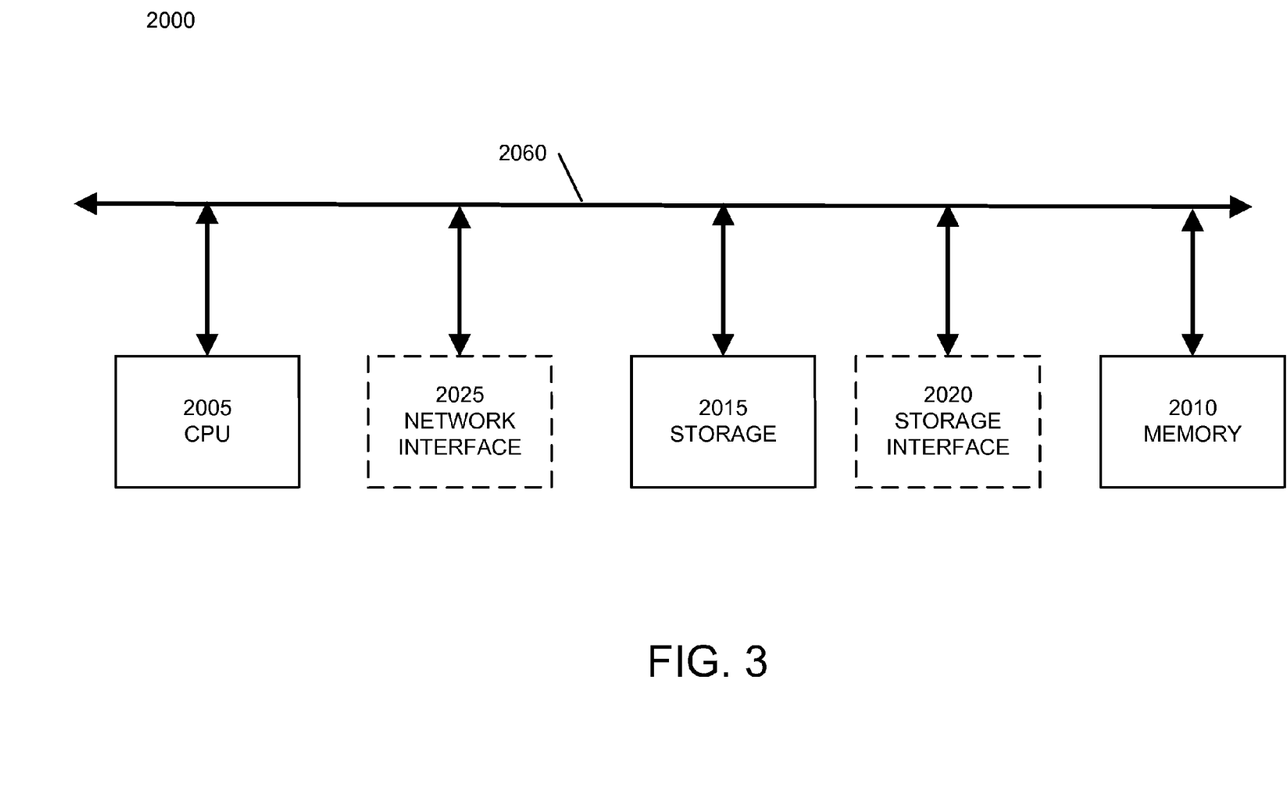
FIG. 3 illustrates a computer system suitable for implementing embodiments of the invention.

FIG. 3 illustrates a computer system suitable for implementing embodiments of the invention. FIG. 3 is a block diagram of a computer system 2000, such as a personal computer or other digital device, suitable for practicing an embodiment of the invention. Computer system 2000 may also include dedicated storage devices, such as hard drives, network attached storage devices, storage array network interfaces, and storage enclosures, that include a microprocessor, microcontroller, or application specific integrated circuit capable of executing or implementing program code.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional storage interface 2020 is adapted to receive storage operations from one or more storage clients. Storage interface 2020 may use a low-level hardware bus interface, such as serial or parallel ATA interfaces and PCI Express interfaces; peripheral device interfaces, such as the various versions of the USB interface, Firewire or IEEE 1394 interfaces, SCSI, and the Thunderbolt interface; storage network hardware interfaces and protocols, such as iSCSI and Fibre Channel; network hardware interfaces and network file system protocols, such as NFS and CIFS; and/or any other type of data storage interface known in the art.

Computer system 2000 includes one or more optional network interfaces 2025 that allow computer system 2000 to communicate with other computer systems via an electronic communications network, and may include wired or wireless communication over local area networks and wide area networks such as the Internet. Optional network interface 2025 may one or more Ethernet connections to communicate with other networking devices via local or wide-area networks. Optional network interface 2025 may one or more wireless network interfaces adapted to communicate with wireless clients and with other wireless networking devices using radio waves, for example using the 802.11 family of protocols, such as 802.11a, 802.11b, 802.11g, and 802.11n. Computer system 2000 may support a variety of networking protocols at one or more levels of abstraction. For example, computer system may support networking protocols at one or more layers of the seven layer OSI network model.

The components of computer system 2000, including CPU 2005, memory 2010, data storage 2015, optional storage interface 2020, and optional network interface 2025 are connected via one or more data buses 2060. Additionally, some or all of the components of computer system 2000, including CPU 2005, memory 2010, data storage 2015, storage interface 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Embodiments of the invention may be implemented within a generalized storage interface that associates time and/or user access restrictions with storage operations on storage blocks, files, objects, binary large objects, database tables and records and/or any other form of storage data. For example, a storage interface may restrict storage reads from a storage block within a specified time period, such as prohibiting storage reads from the storage block before or after a specified date. In these embodiments, storage leases may be implemented using the storage interface to associate a time restriction with a storage write operation to one or more storage blocks.

As described above, assigning a storage lease to a storage block may be confirmed through the use of cryptographically signed digital certificates. However, an alternate embodiment may omit the use of cryptographically signed digital certificates and let storage clients rely on the trusted relationship with the storage hardware. Similarly, another alternate embodiment of a storage interface may use cryptographically signed digital certificates to confirm the completion of any type of storage operation, regardless of whether storage leases are supported by the storage system.

In yet another embodiment, more advanced cryptography and/or cryptographic capabilities may be used to confirm the assignment of a storage lease to one or more storage blocks. For example, a private key/public key pair may be used by storage clients and the storage device to confirm storage leases. In a further example, cryptographic hardware, such as a trusted platform module, may be used to confirm the assignment of a storage lease. In another example, the one or more cryptographic keys used to confirm storage leases may be revoked and optionally replaced by a trusted authority in the event of a security breach. In still another example, the cryptographic technique may be changed by a trusted authority in the event that a security weakness is discovered. This may be performed via a storage device, operating system, and/or software application update from a trusted authority.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A non-transitory computer-readable storage medium including instructions adapted to direct a computer to perform an operation, the operation comprising:

receiving a first storage operation from a storage client, wherein the first storage operation is associated with first stored data;

in response to receiving the first storage operation, accessing first storage lease information stored in one or more exclusive lease blocks specifying a first specific time and a second specific time of restricted access for the first stored data, the second specific time being after the first specific time, wherein the first storage lease information is stored in one or more lease blocks on the non-transitory computer-readable storage medium; wherein the one or more exclusive lease blocks are a portion of the non-transitory computer-readable storage medium configured to only store first storage lease information;

comparing the first storage lease information retrieved from the one or more exclusive lease blocks with a current time reference;

allowing the storage client to access the first stored data in response to the current time reference being before the first specific time specified by the first storage lease information and in response to determining the one or more data blocks associated with the first storage operation are associated with the first storage lease information; and restricting the storage client from either reading or overwriting the first stored data in response to the one or more data blocks associated with the first storage operation are not associated with the first storage lease information, or the current time reference being after the first specific time and before the second specific time specified by the first storage lease information.

2. The non-transitory computer-readable storage medium of claim 1, wherein the first storage lease information includes a timestamp.

3. The non-transitory computer-readable storage medium of claim 2, wherein the timestamp indicates the end of the first specific time period for restricted access to the first stored data.

4. The non-transitory computer-readable storage medium of claim 2, wherein the timestamp indicates the beginning of the first specific time period for restricted access to the first stored data.

5. The non-transitory computer-readable storage medium of claim 1, wherein allowing the first storage operation comprises:
   determining a storage space-time rate based on an amount of data consumed and a second time period of restricted storage access for at least one previously performed storage operation;
   comparing the storage space-time rate with a storage space-time rate limit; and
   allowing the first storage operation in response to the storage space-time rate being less than the storage space-time rate limit.

6. The non-transitory computer-readable storage medium of claim 1, comprising: generating a security certificate in response to the completion of at least the first storage operation, wherein the security certificate indicates completion of at least the first storage operation.

7. The non-transitory computer-readable storage medium of claim 6, wherein the security certificate includes a cryptographic hash based on at least the first storage operation.

8. The non-transitory computer-readable storage medium of claim 1, wherein the current time reference is received from an internal clock isolated from the storage client.

9. The non-transitory computer-readable storage medium of claim 1, wherein the current time reference is received from at least one external time server.

10. The non-transitory computer-readable storage medium of claim 9, wherein the current time reference is received as at least one cryptographically signed time certificate.

11. The non-transitory computer-readable storage medium of claim 1, wherein the current time reference is based at least in part on a measurement of a periodic process of a storage device.

12. The non-transitory computer-readable storage medium of claim 1, wherein the first storage operation includes a data write operation.

13. The non-transitory computer-readable storage medium of claim 12, wherein the first storage operation includes new storage lease information, the operation comprising:
   in response to allowing the first storage operation, updating the first storage lease information with the new storage lease information.

14. The non-transitory computer-readable storage medium of claim 1, wherein the first storage operation includes a data read operation.

15. The non-transitory computer-readable storage medium of claim 1, wherein the first storage lease information is associated with a first storage block including the first stored data.

16. The non-transitory computer-readable storage medium of claim 1, comprising:
   in response to the current time reference being between the first specific time and the second specific time, providing a response message to the storage client indicating that the first storage operation was not performed.

17. The non-transitory computer-readable storage medium of claim 1, wherein the restricted access to the first stored data includes at least one of reading or writing of the first stored data.

* * * * *